United States Patent
Matsuoka et al.

[11] Patent Number: 5,936,609
[45] Date of Patent: Aug. 10, 1999

[54] HANDY INFORMATION TERMINAL APPARATUS

[75] Inventors: Shigeru Matsuoka; Yuji Suganuma, both of Hitachi; Kouichi Saito, Kitaibaraki, all of Japan

[73] Assignee: Hitachi, Ltd., Tokyo, Japan

[21] Appl. No.: 08/791,511

[22] Filed: Jan. 30, 1997

[30] Foreign Application Priority Data

Feb. 22, 1996 [JP] Japan .................................. 8-34583

[51] Int. Cl.⁶ .................................................. H05K 7/16
[52] U.S. Cl. ............................ 345/156; 345/905; 361/600; 361/679
[58] Field of Search ............................ 361/600, 679, 361/681, 683, 684, 686; 345/156, 905

[56] References Cited

U.S. PATENT DOCUMENTS

| | | | |
|---|---|---|---|
| 3,942,077 | 3/1976 | Powers | 361/686 |
| 4,850,044 | 7/1989 | Block et al. | 359/159 |
| 5,115,374 | 5/1992 | Hongoh | 361/618 |
| 5,212,628 | 5/1993 | Bradbury | 361/683 |
| 5,357,091 | 10/1994 | Ozawa et al. | 235/380 |
| 5,489,924 | 2/1996 | Shima et al. | 345/173 |
| 5,602,721 | 2/1997 | Slade et al. | 361/727 |

*Primary Examiner*—Mark R. Powell
*Assistant Examiner*—Vincent E. Kovalick
*Attorney, Agent, or Firm*—Antonelli, Terry, Stout & Kraus, LLP

[57] ABSTRACT

To the bottom of a display unit in a handy information terminal apparatus, a picture image scanner, a photographic camera or a printer may be physically and electrically mounted. Signal transfer is carried out between the handy information terminal apparatus and each of the scanner, the camera or and the printer. The handy information terminal apparatus is of a size which makes it easy to carry the handy information terminal apparatus and is combined with the scanner, the camera or the printer. The handy information terminal apparatus can be easily mounted on the scanner, the camera or the printer and obtained information can be accurately transmitted therebetween.

14 Claims, 7 Drawing Sheets

HANDY INFORMATION TERMINAL APPARATUS

BACKGROUND OF THE INVENTION

The present invention relates to a handy type information terminal apparatus and more particularly to a handy type information terminal apparatus having a compact size property and a superior portability property and further capable for use by combining with another optional machine and apparatus, such as a picture image scanner, a photograph use camera, and a printing use printer.

In the handy type information terminal apparatus, to heighten the portability property the function properties in the handy type information terminal apparatus are kept to a minimum and thereby the compact size property of the handy type information terminal apparatus has been pointed to an extent wherein the handy type information terminal apparatus is enable to put into a pocket of the clothes.

The handy type information terminal apparatus is called as, for example, a hand-held personal computer or a personal digital assistant apparatus.

However, in a conventional this kind of a handy type information terminal apparatus, there are problems in which an operator makes an effort to obtain the detailed information at the place where the operator has gone and further makes an effort to edit and to exactly transmit the obtained information.

In case where the functions in the handy type information terminal apparatus are much reduced, for example, since an input manner and an expression manner about the concrete information obtained at the place where the operator has gone is insufficient, there is a problem that it is impossible to sufficiently transmit the exact information.

Further, under the consideration about the weight and the size dimension in the handy type information terminal apparatus, in case that the printing function is removed from the handy type information terminal apparatus, it is impossible to confirm the contents of the information on an actual sheet or an actual paper.

In the conventional handy type information terminal apparatus, the above stated problems become unavoidably ones which inevitably cause from the pointing for obtaining the compact size property and the light weight property for the handy type information terminal apparatus.

For solving the above stated problems, there is one manner where the compact size property and the light weight property in the handy type information terminal apparatus are devised by separating an unit for unnecessary handy always to carry, for example, a printer and a picture image scanner, from a main body of the handy type information terminal apparatus.

For solving the above stated problems, there is another manner where the compact size property and the light weight property in the handy type information terminal apparatus are devised by integrally forming an unit, for example, a printer and a picture image scanner, to a main body of the handy type information terminal apparatus.

In the latter another manner handy type information terminal apparatus, the integrally combined apparatus is made smaller than the assembled combined body comprised of a sum of the size dimension of the main body and the size dimension of the printer or the assembled combined body comprised of a sum of size dimension of the main body and the size dimension of the picture image scanner shown in the former one manner handy type information terminal apparatus.

In Japanese patent laid-open publication No. 100,645/1993, for example, a technical solving device similar to the another manner stated in the above latter solving manner is disclosed.

However, in the above stated Japanese patent laid-open publication No. 100,645/1993, since the technique does not point to the portability property of the handy type information terminal apparatus, the above stated integrally combined unit (for example, the integrally combined apparatus of the main body and the printer or the integrally combined apparatus of the main body and the picture image scanner etc.), it can assume that the size of the handy type information terminal apparatus can be smaller than the size of the above stated former assembled combined apparatus.

In the above stated handy type information terminal apparatus shown in the above stated Japanese patent laid-open publication No. 100,645/1993, the handy type information terminal apparatus is confined to a stationary system handy type information terminal apparatus and this handy type information terminal apparatus does not point to the portability handy type information terminal apparatus.

SUMMARY OF THE INVENTION

An object of the present invention is to provide a handy type information terminal apparatus wherein a compact size and a light weight handy type information terminal apparatus can be obtained.

Another object of the present invention is to provide a handy type information terminal apparatus wherein the exact information can be obtained or can transmit at the place where an operator has gone.

A further object of the present invention is to provide a handy type information terminal apparatus wherein the picture image can be easily obtained or the most suitable detailed information can be immediately obtained.

A further object of the present invention is to provide a handy type information terminal apparatus wherein the information can be instantly confirmed when the printing is necessary.

A further object of the present invention is to provide a handy type information terminal apparatus wherein the convenience property of the handy type information terminal apparatus can be heightened and the handy type information terminal apparatus can be corresponded to the multi-function.

A further object of the present invention is to provide a handy type information terminal apparatus wherein the portability property of the handy type information terminal apparatus can be improved at a combined state of the handy type information terminal apparatus and another optional machine and apparatus.

According to the present invention, for obtaining or transmitting the sure information at the place where the operator has gone, the handy type information terminal apparatus has a fixing element for physically and temporally fixed an optional machine and apparatus, such as the picture image scanner, the photograph use camera and the printer for enable to print the input edition result at that place.

The above stated optional machine and apparatus is physically and temporally fixed to the rear side of the liquid crystal display unit in the handy type information terminal apparatus through the fixing element.

According to the present invention, each of the handy type information terminal apparatus and the optional machine and apparatus has the communication means (for example, a connector) which is enable to electrically and easily give and receive the signal at the fixed state of the handy type information terminal apparatus with the optional machine and apparatus through the above stated fixing element.

Further, each of the optional machine and apparatus, such as the picture image scanner, the photograph use camera and the printer, is attachably to and detachably from the handy type information terminal apparatus.

The projection area of each of the optional machine and apparatus, such as the picture image scanner, the photograph use camera and the printer, is the same area, the substantially same area or not exceeding the projection area of the handy type information terminal apparatus, thereby in the combined state of the handy type information terminal apparatus with the optional machine and apparatus, the portability of the integrally combined apparatus can be improved.

According to the present invention, a handy type information terminal apparatus comprises an input unit for inputting at least the character, a liquid crystal display unit for displaying input information inputted by the input unit and an edition result of the inputted information, and a control substrate for storing a system program which stores temporally the inputted character etc. from the input unit.

A fixing element and an electric element are provided on the handy type information terminal apparatus, the fixing element fixes attachably to and detachably from an optional machine and apparatus. An electric element is provided on the handy type information terminal apparatus.

The optional machine and apparatus is attachably mounted on and detachably mounted from the rear side of the liquid crystal display unit of the handy type information terminal apparatus the fixing element.

In the fixed state of the handy type information terminal apparatus with the optional machine and apparatus through the fixing element, the electric element takes in data from the optional machine and apparatus and gives and receives data between the handy type information terminal apparatus and the optional machine and apparatus.

DESCRIPTION OF THE INVENTION

Hereinafter, one embodiment of a handy type information terminal apparatus according to the present invention will be explained referring to drawings.

Figure 1:
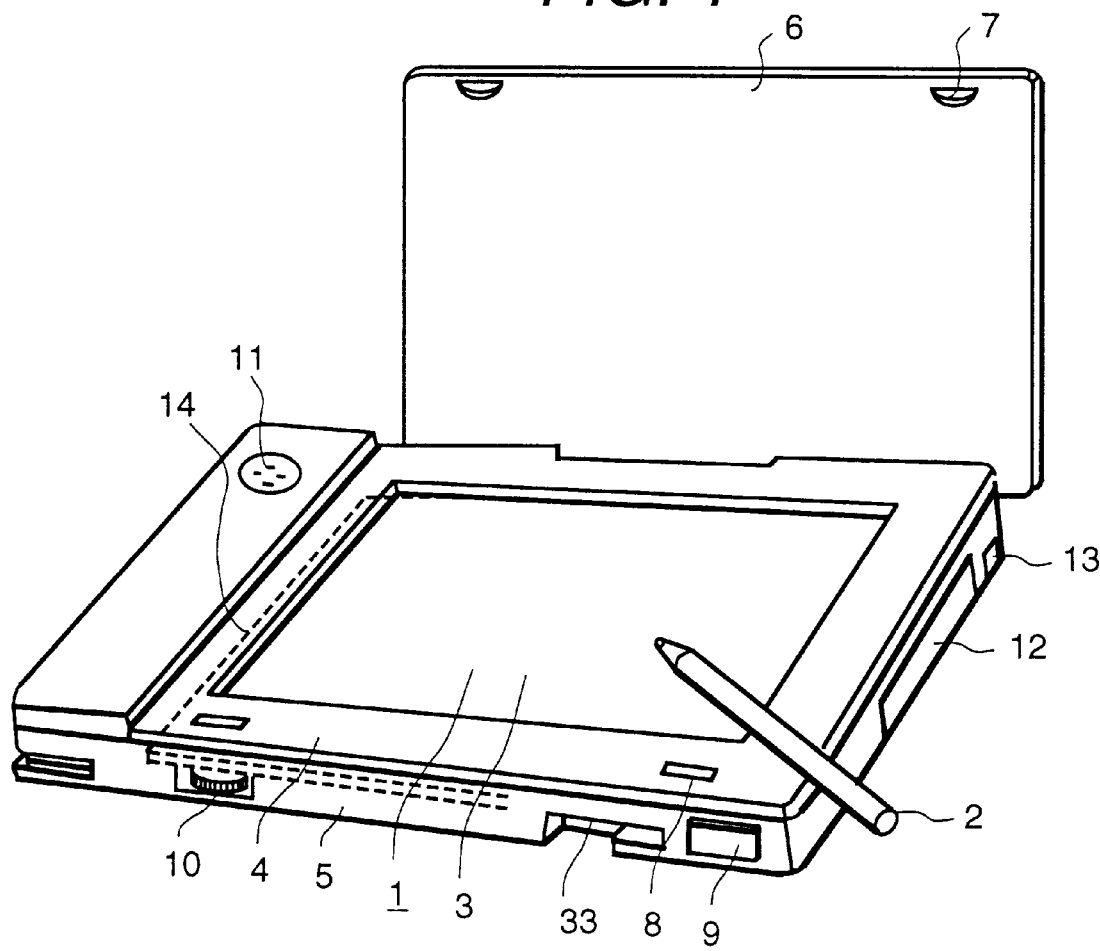
FIG. 1 is an outer appearance view showing one embodiment of a handy type information terminal apparatus according to the present invention.

FIG. 1 is an outer appearance view showing one embodiment of a handy type information terminal apparatus according to the present invention.

One embodiment of a handy type information terminal apparatus according to the present invention comprises a coordinates input unit 1 for inputting the character, the graph, the photography, the picture etc., a pen 2, a liquid crystal display 3 disposed on a lower portion of the coordinates input unit 1, an architrave form upper case 4 for covering surrounding portions of the coordinates input unit 1 and the liquid crystal display 3, and a lower case 7.

The coordinates input unit 1 comprises a pressure sensitive element etc. and ordinary is called as a tablet. The information is inputted from a surface of the coordinates input unit 1 by the pen 2. The input information from the coordinates input unit 1 is displayed on the liquid crystal display 3.

The lower case 5 accommodates and arranges a latter stated control substrate etc. A main body case of the handy type information terminal apparatus is constituted by the upper case 4 and the lower case 5.

The handy type information terminal apparatus according to the present invention comprises further a cover 6 for protecting the coordinates input unit 1 during the handy carry time, an engaging claw 7 provided on a rear portion of the cover 6, a fitting-into hole 8 provided on a front portion of the upper case 4, and a push bottom 9 provided on a front portion of the lower case 5.

In the handy type information terminal apparatus, when the cover 6 is closed to the fitting-into hole 8 of the upper case 4, the engaging claw 7 of the cover 6 engages with the fitting-into hole 8 of the upper case 4. The engagement state of the cover 6 formed between the engaging claw 7 and the fitting-into hole 8 is released by the push bottom 9 of the lower case 4 and then the cover 6 is opened.

The handy type information terminal apparatus according to the present invention comprises further a contrast volume 10 for adjusting the contrast of a display screen of the liquid crystal display 3, a sending speaker 11 corresponded to the operational function, a card slot 12 capable to insert various kinds of cards such as a memory card and a communicating card, and an injecting bottom 13 for taking out the card.

The handy type information terminal apparatus according to the present invention comprises further a control substrate member or a control circuit board member (a controlling circuit board) 14 arranged at the lower portion of the lower case 4 and this control substrate 14 controls a whole apparatus.

Next, a connection relationship between respective components in an interior portion of the handy type information terminal apparatus will be explained referring to FIG. 2.

Figure 2:
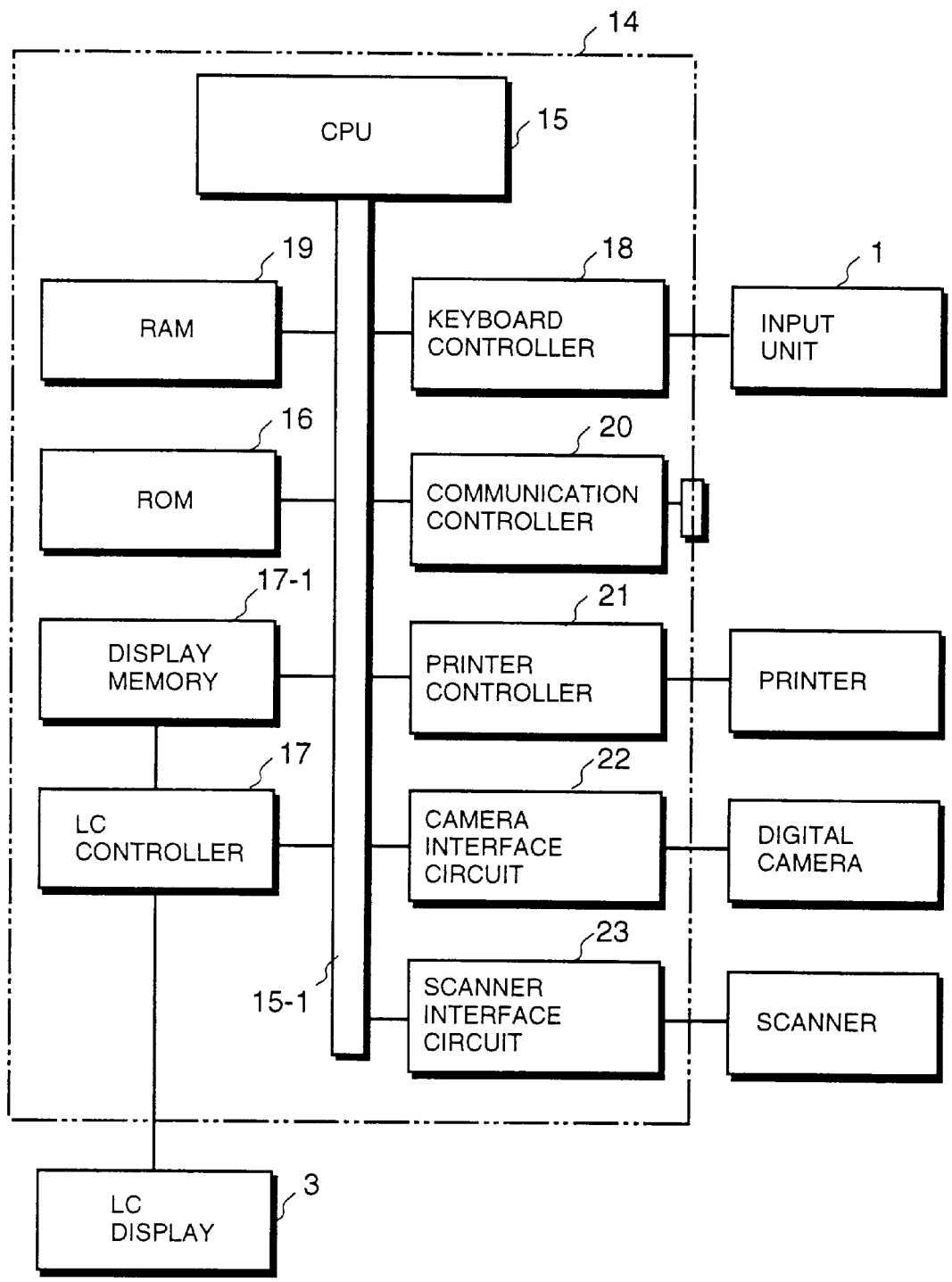
FIG. 2 is a block diagram showing a control circuit of one embodiment of a handy type information terminal apparatus according to the present invention.

FIG. 2 is a block diagram showing a control circuit block diagram of one embodiment of the handy type information terminal apparatus according to the present invention.

In FIG. 2, the control circuit in the handy type information terminal apparatus comprises a program accumulation type calculating unit 15 (hereinafter, it is called as "CPU") and to a bus 15-1 of CPU 15 various kinds of the devices, which are explained using numeral references of 16–23, are connected.

To the bus 15-1 of CPU 15, a read-only-memory 16 (hereinafter, "ROM") is connected. The programs are stored in ROM 16 and in this ROM 16 in addition to the program function, a dictionary used in the edition and the character fonts used at an output operation time etc. are included.

To the bus 15-1 of CPU 15, a liquid crystal controller 17 is connected through a display use memory 17-1 and this liquid crystal controller 17 controls the display of the liquid crystal according to the programs.

The liquid crystal controller 17 processes the display of the characters etc. on the above stated liquid crystal display 3, the characters etc. are input through a keyboard controller 18 from the coordinates input unit 1.

To the bus 15-1 of CPU 15, a random access memory 19 (hereinafter, "RAM") is connected and this RAM 19 stores an input data or the edition result processed by the keyboard controller 18.

With the above stated construction in the handy type information terminal apparatus according to the present invention, complying with the input about the information from the coordinates input unit 1 using the pen 2, the contents of the inputted information are held in RAM 19.

Further, through the liquid crystal controller 17, a series of processing motions for displaying on the liquid crystal display 3 is carried out.

Further, to the bus 15-1 of CPU 15, a communication controller 20, a printer controller 21 connected to a printer and for controlling the printer, a camera interface circuit 22 connected to a camera, in particular a digital camera, and for controlling the camera, and a scanner interface circuit 23 connected to the picture image scanner and for controlling the picture image scanner are connected, respectively.

In case where the communication, the printing, the camera or the picture image scanner is selected by the execution of the programs, the output or the input is carried out to the respective devices through the respective controller or the respective interface circuit.

Figure 3:
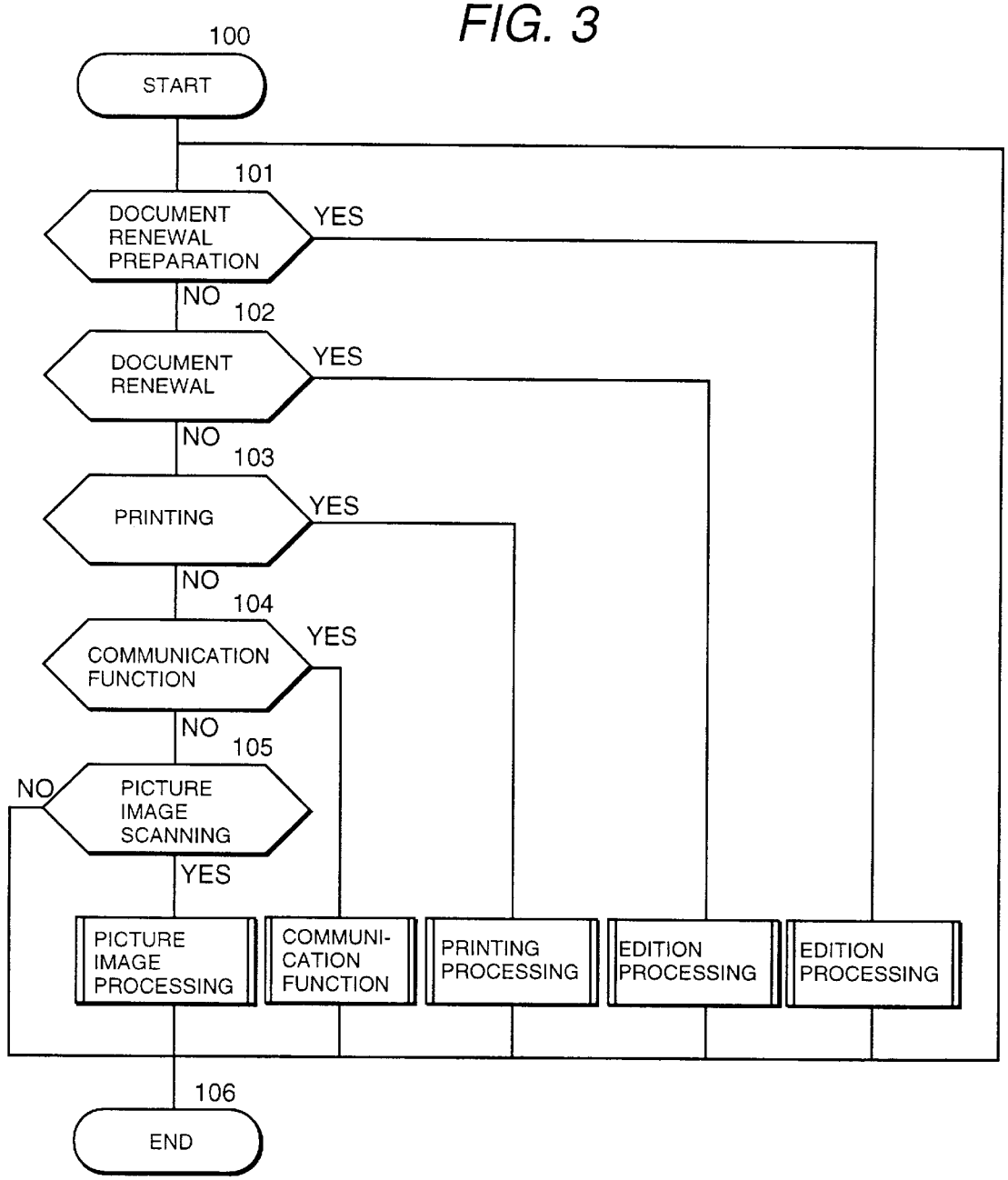
FIG. 3 a block diagram showing a control processing motion of one embodiment of a handy type information terminal apparatus according to the present invention.

Next, a series of processing operations in the handy type information terminal apparatus according to the present invention will be explained referring to FIG. 3.

The processing is carried out as followings. Namely, a processing starting message as the handy type information terminal apparatus and a processing working menu capable to practice are displayed on the liquid crystal display 3.

And a working menu and a selection menu which are designated by the operation from the coordinates input unit 1 by the operator.

A processing 100 shows a start step 100 for activating the handy type information terminal apparatus. In a processing 101, it judges whether the designated document is a document new preparation working or not.

When it is the document new preparation working, it transfers to an edition processing of the document new preparation. When it is not the document new preparation working, it proceeds to a next step.

In a processing step 102, it judges whether a document renewal processing working is or not. When it is the document renewal processing working, it transfers to an edition processing of the document renewal preparation. When it is not the document renewal processing working, it proceeds to a next step.

In a processing step 103, it judges whether a printing processing working is or not. When it is the printing processing working, it transfers to the printing processing working. When it is not the printing processing working, it proceeds to a next step.

In a processing step 104, it judges whether a communication function processing working is or not. When it is the communication function processing working, it transfers to the communication function processing. When it is not the communication function processing working, it proceeds to a next step.

In a processing step 105, it judges whether a picture image scanning processing working is or not. When it is the picture image scanning processing working, it transfers to the picture image scanning processing. When it is not the picture image scanning processing working, the processing finishes at a processing 106.

As stated in above, in the respective processing 101–105, in case of the processing working corresponding to the respective processing steps, such a processing is carried out by branching the corresponding respective processing. After the execution of the processing, it returns a first processing step 100.

It carries out repeatedly the processing where another processing is continuously carried out or at a finish step 106 the processing finishes.

Next, one embodiment of the handy type information terminal apparatus according to the present invention will be explained in detail.

According to the present invention, the handy type information terminal apparatus is handy to carry by one hand of the operator has the weight of about 200 gram to about a several hundreds gram.

In the present invention, this handy type information terminal apparatus is enable to mount attachably to and detachably from an optional machine and apparatus, such as a picture image scanner, a photograph use digital camera or a printing use printer.

Each of these apparatuses has a several gram degree and is enable to combine respectively with the handy type information terminal apparatus.

In particularly, in an integrally combined state of the handy type information terminal apparatus with the digital camera, an integrally combined apparatus has less than 1 Kg and then the handy type information terminal apparatus can integrally combine with the digital camera.

Further, the handy type information terminal apparatus as one body according to the present invention has the lengthwise and lateral size dimension (the projection area) of B6 size degree and has the thickness of 15 mm degree. The display screen of the liquid crystal display 3 has a size dimension having about 20–25 lines/page and about 40 characters/line.

In particularly, in the handy type information terminal apparatus according to the present invention, since the size dimension having about 40 characters/line is agreed with the specification of the facsimile communication, it is unnecessary to provide a converter.

Accordingly, the facsimile communication can be easily carried out and further the handy type information terminal apparatus becomes more effective.

Figure 4:
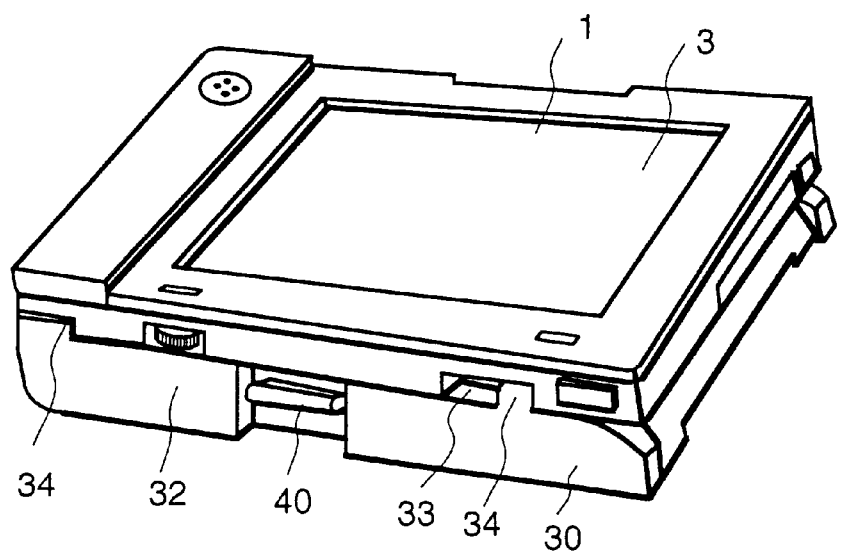
FIG. 4 is an outer appearance view showing a state where one embodiment of a handy type information terminal apparatus according to the present invention is integrally engaged with a picture image scanner.
Figure 5:
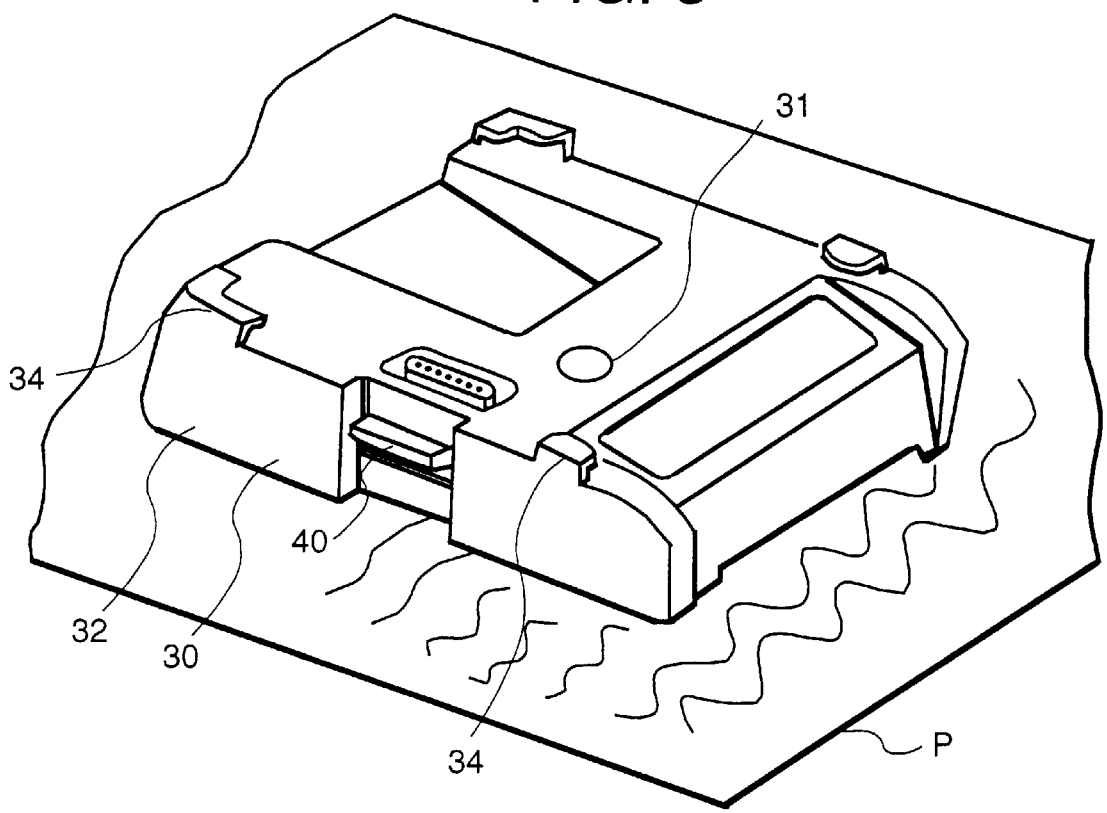
FIG. 5 is an explanatory view showing an use state where the photography is read in by the picture image scanner.
Figure 6:
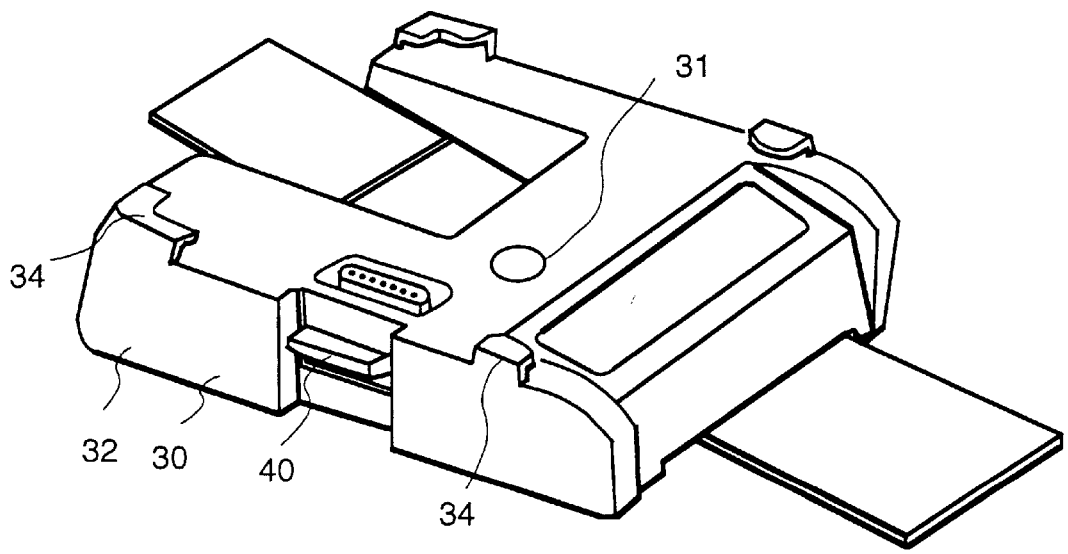
FIG. 6 is an explanatory view showing an use state where the business card is read in by the picture image scanner.

FIG. 4 is an outer appearance view showing a state where the handy type information terminal apparatus is attachably mounted to and detachably mounted from the picture image scanner, and FIG. 5 and FIG. 6 are outer appearance views showing the picture image scanner.

In these FIGS. 4, 5 and 6, at time when necessary information is obtained, a picture image scanner 30 is set on an information source, for example, a photography P as shown in FIG. 5.

By pushing a scanning bottom 31 provided on the picture image scanner 30, the picture image scanner 30 is moved on the information source and the necessary information is read in by the picture image scanner 30. The read-in necessary information is inputted into the handy type information terminal apparatus.

In FIG. 6, the information such as a name card is read in and this obtained information is inputted into the handy type information terminal apparatus, thereby the handy type information terminal apparatus can be used to have the function for preparing an address book etc.

A fixing element 34 is provided at an upper face of a case 32 of the picture image scanner 30. The above fixing element 34 is provided on a lower case 5 of the handy type information terminal apparatus.

This fixing element 34 is integrally engaging with a fitting-into portion 33 (a fixing element) provided on a side of the handy type information terminal apparatus. The fixing element 34 provided on a side of the picture image scanner 30 is an engagement claw 34, for example.

The picture image scanner 30 is attachably mounted to and detachably mounted from a rear side of the liquid crystal display 3 of the handy type information terminal apparatus through the fixing element 34 provided on the picture image scanner 30 and the fitting-into portion 33 provided on the handy type information terminal apparatus.

Accordingly, the picture image scanner 30 is integrally engaged attachably to or detachably from the handy type information terminal apparatus through the engagement claw 34 and the fitting-into portion 33. The picture image scanner 30 is handy to carry with the handy type information terminal apparatus together.

The engagement and the disengagement between the handy type information terminal apparatus and the picture image scanner 30 are performed by relatively sliding the picture image scanner 30 toward the lateral direction with the handy type information terminal apparatus.

Further, even under an integral engagement state where the handy type information terminal apparatus is integrally engaged with the picture image scanner 30, the above stated image scanning operation is enable to perform through the operation using the coordinates input unit 1 by the operator.

An electric element 40 is provided on the picture image scanner 30. The electric element 40 is an element for electrically connecting both of the handy type information terminal apparatus and the picture image scanner 30 under above stated state where the handy type information terminal apparatus and the picture image scanner 30 are engaged with and combined with. The electric element 40 is a knob for operating a connector 41 stated in latter.

Figure 7:
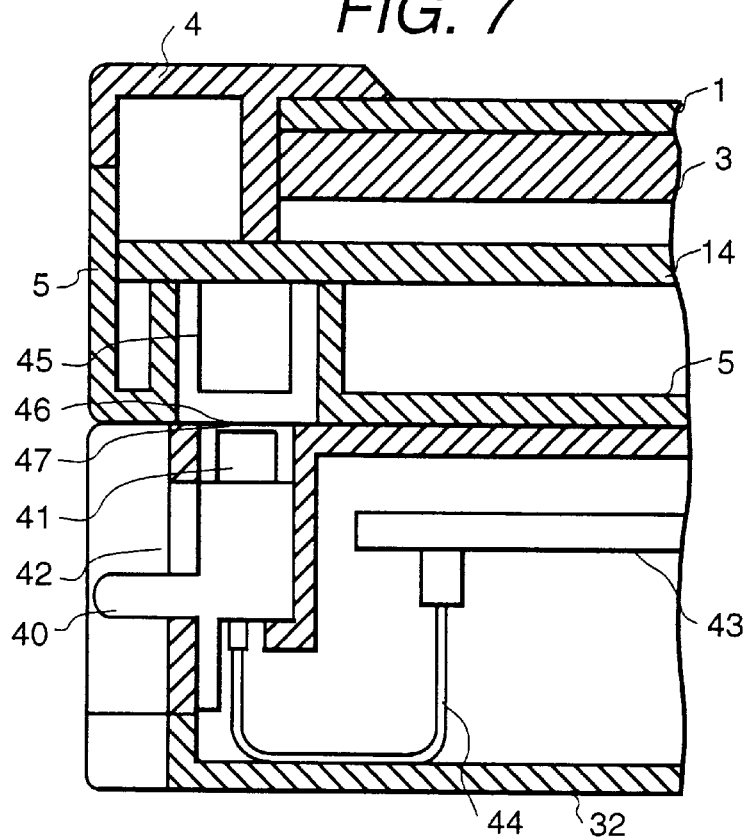
FIG. 7 is a partially cross-sectional view showing a state where before a connector connection of one embodiment of the handy type information terminal apparatus according to the present invention is integrally engaged with the picture image scanner.
Figure 8:
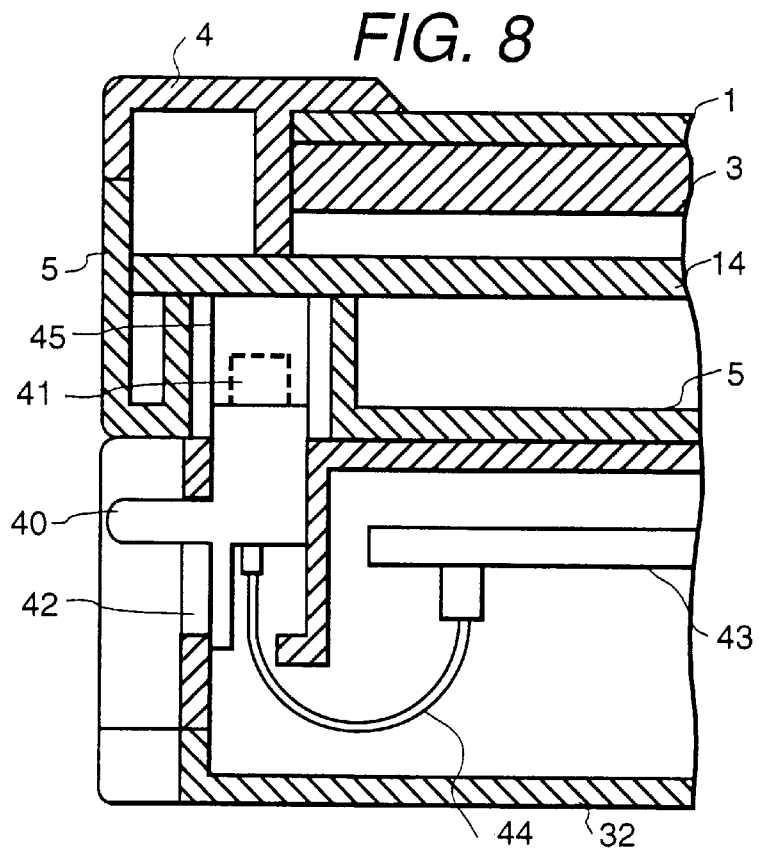
FIG. 8 is a partially cross-sectional view showing a state where after the connector connection of one embodiment of the handy type information terminal apparatus according to the present invention is integrally engaged with the picture image scanner.

FIG. 7 and FIG. 8 are explanatory construction views showing the connection states of the combined sate of the handy type information terminal apparatus with the picture image scanner 30 shown in FIG. 4.

In FIG. 7 and FIG. 8, the synthetic resins knob 40, which is integrally fixed with the connector 41, is projected toward the lateral direction from a sliding hole 43. The sliding hole 43 is provided on a case 32 of the picture image scanner 30. This knob 40 is constituted to slide artificially toward an up-and down direction in company with the connector 41.

The connector 41 forms a metal slip (pin) and is electrically connected to an electronic component (not shown) of a control substrate 43 which is provided on the picture image scanner 30 through a flexible print board 44.

A connector 45 is provided on the control substrate 14 of the handy type information terminal apparatus. This connector 45 provided on the handy type information terminal apparatus is enable to connect to the connector 41 provided on the picture image scanner 30.

This connector 45 provided on the handy type information terminal apparatus can form a connector having downward two blade elements or having a downward-opened cylindrical shape, for example.

An opening portion 46 is formed on an upper face of the case 32 of the picture image scanner 30 and permits to project the connector 41 toward an upper portion. An opening portion 47 is formed on a lower face of the lower case 5 of the handy type information terminal apparatus.

When the handy type information terminal apparatus and the picture image scanner 30 are combined with as shown in FIG. 4, the opening portion 46 formed on the picture image scanner 30 is oppositely arranged with the opening portion 47 provided on the handy type information terminal apparatus.

FIG. 8 is a partially cross-sectional view showing a state where the connector 45 is connected to sandwich the connector 41 by lifting the knob 40 toward the upper portion.

In the above state shown in FIG. 8, since the flexible printing board 44 is a flexible element and is bent shown in FIG. 8, the knob operation can be smoothly operated.

Accordingly, the sure engagement and the good electrical connecting state between the connector 45 provided on the handy type information terminal apparatus and the connector 41 provided on the picture image scanner 30 can be obtained.

When the fixing and the connection of the picture image scanner 30 with the handy type information terminal apparatus has been completed, the picture image having been read in or scanned by the picture image scanner 30 is taken in or read in the handy type information terminal apparatus.

Therefore, the scanned image data by the picture image scanner 30 can be edited and processed by the handy type information terminal apparatus.

In case where the picture image scanner 30 is not used, as shown in FIG. 7, the connector 41 is drawn into the case 32 and as a result the damage prevention of the connector 41 can be performed and also the safety of the connector 41 can be attained.

Besides, the connector 45 provided on the handy type information terminal apparatus is handy to carry and this connector 45 is constituted not to project from the opening portion 47 which is provided on the handy type information terminal apparatus.

Accordingly, the damage of the connector 45 can be prevented and the quality over a long period of the connector 45 can be guaranteed.

Further, since the opening portion 47 provided on the handy type information terminal apparatus is formed to direct toward the down portion, during the ordinary use operation time, the opening portion 47 can prevent from the entering of the dusts or the water drops, as much the reliability of the handy type information terminal apparatus can be improved.

The lengthwise and the lateral size dimensions of the above stated image scanner 30 have B6 size degree similarly to those of the handy type information terminal apparatus or have the size dimensions not exceeding over those of the handy type information terminal apparatus.

In the combined apparatus state of both the handy type information terminal apparatus and the picture image scanner 30, the portability property of the combined apparatus hardly obstruct.

The thickness of the picture image scanner 30 is 1 inch degree and is constituted to not exceed over twice times of the thickness of the handy type information terminal apparatus.

Figure 9:
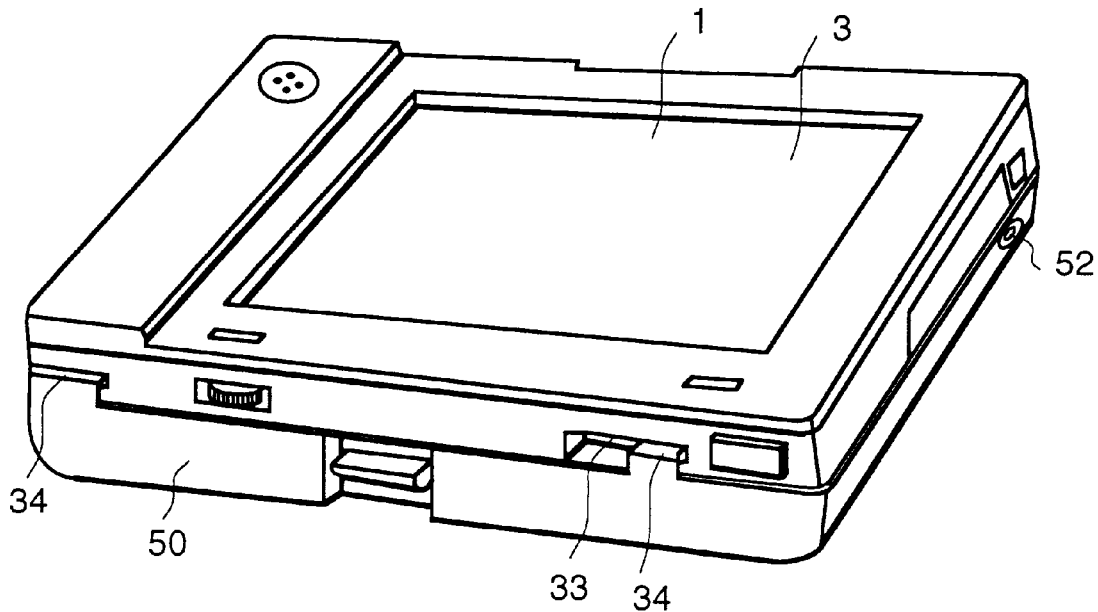
FIG. 9 is an outer appearance view showing a state where one embodiment of the handy type information terminal apparatus according to the present invention is integrally engaged with a photograph use camera.
Figure 10:
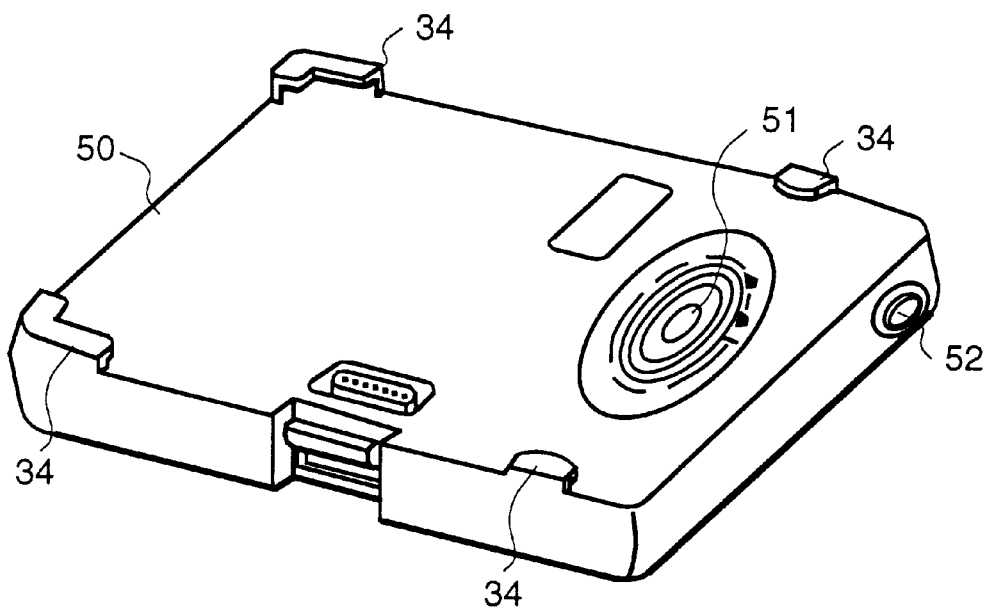
FIG. 10 is an outer appearance view showing the photograph use camera.

FIG. 9 is an outer appearance view showing a state where a photograph use camera 50 is integrally engaged with the handy type information terminal apparatus similarly to the above stated image scanner 30. FIG. 10 is an outer appearance view showing the photograph use camera 50.

The photograph use camera 50 is a digital camera etc. The digital camera 50 comprises a lens 51 for the photograph and a shutter bottom 52.

In FIG. 10, the camera lens 51 is provided at a connecting face of the handy type information terminal apparatus and a camera main body of the digital camera 50.

However, in case that the camera lens 51 is provided at a lower side of the connecting face of the handy type information terminal apparatus and the camera main body of the digital camera 50, at a state where the digital camera 50 is connected to the handy type information terminal apparatus, the photograph operation can be performed.

The digital camera 50 is attachably mounted to and detachably mounted from the rear side of the liquid crystal display 3 of the handy type information terminal apparatus through the fixing element 34 of the digital camera 50 and the fitting-into portion 33 of the handy type information terminal apparatus.

By performing a special process of the picture image data which has been photographed by the digital camera 50, the picture image data obtained by the digital camera 50 can be displayed on the liquid crystal display 3 of the handy type information terminal apparatus.

As a result, the photographed contents obtained by the digital camera 50 can be confirmed instantly by the handy type information terminal apparatus and the necessary information can be immediately taken in the handy type information terminal apparatus.

Further, in the above stated digital camera 50, the projecting area of the digital camera 50 is formed similarly to that of the handy type information terminal apparatus.

Therefore, in a combined state of the integrally combined apparatus of the digital camera 50 with the handy type information apparatus, the increase in the lengthwise and the lateral size dimensions the integrally combined apparatus be prevented.

The thickness of the digital camera 50 is formed to not exceed over the thickness of the handy type information terminal apparatus.

Further, the thickness of the combined apparatus of the digital camera 50 with the handy type information terminal apparatus has the size dimension of not exceeding over two times of the thickness of the handy type information terminal apparatus.

In concretely, the digital camera 50 has the thickness of less than 5 cm and under the combined state the integrally combined apparatus can have by one hand of the operator.

The digital camera 50 has the weight of several hundreds gram and the integrally combined apparatus has the weight of not exceed over 1 Kg.

Accordingly, under the combined apparatus state, the combined apparatus is suite to use at the embodied example where the photographed contents are displayed to the liquid crystal display 3 of the handy type information terminal apparatus.

Figure 11:
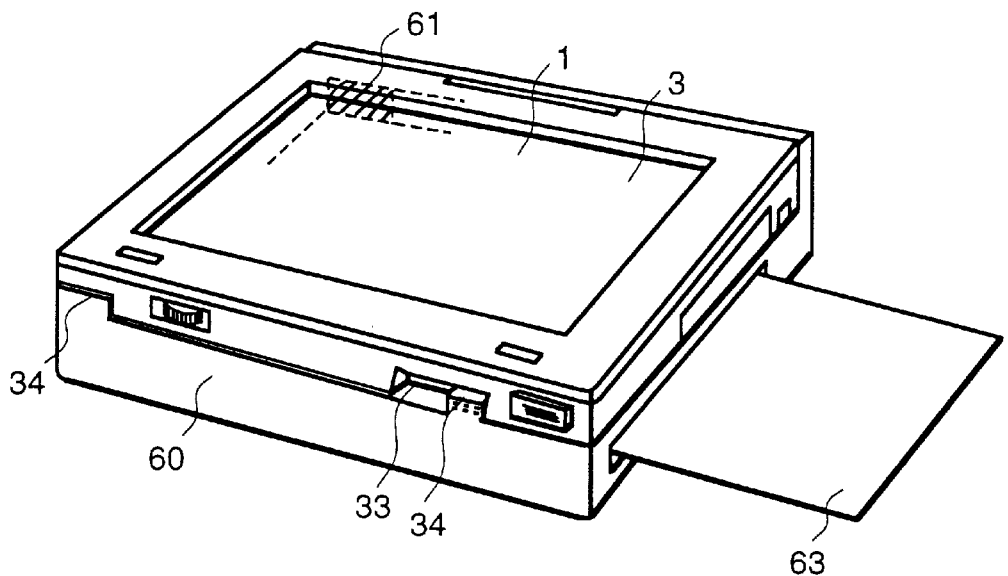
FIG. 11 is an outer appearance view showing a state where one embodiment of the handy type information terminal apparatus according to the present invention is integrally engaged with a printer.
Figure 12:
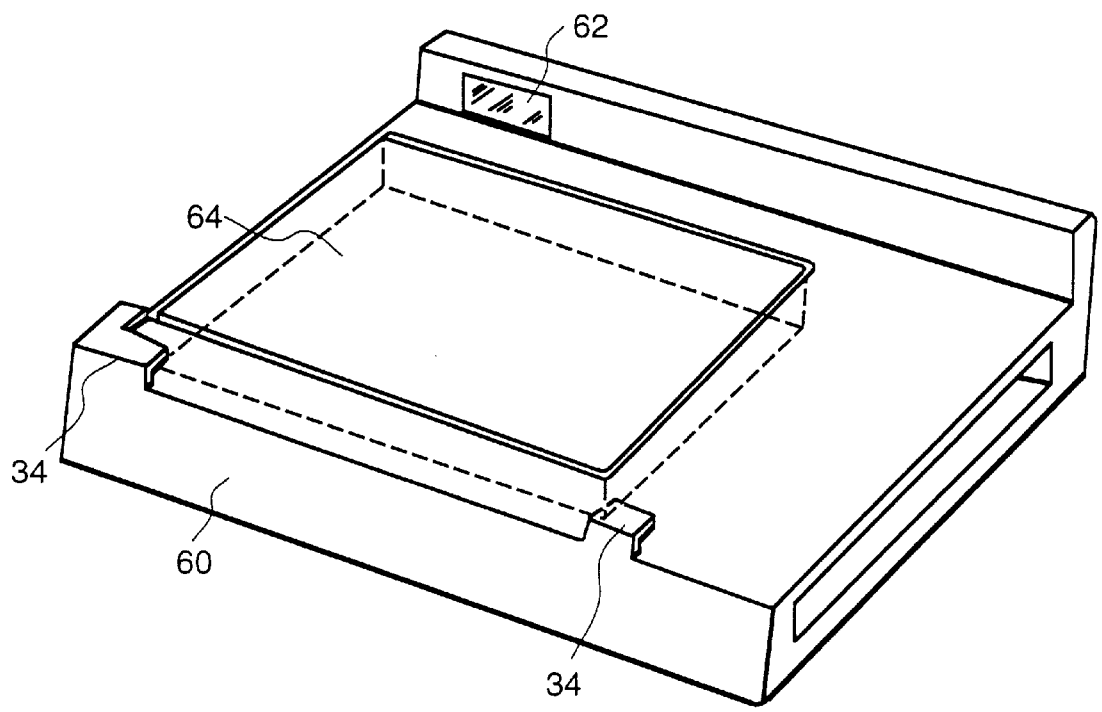
FIG. 12 is an outer appearance view showing the printer.

FIG. 11 is an outer appearance showing a state where a printer 60 is integrally engaged with the handy type information terminal apparatus similarly to the above stated the integrally combined apparatus of the digital camera 50 with the handy type information terminal apparatus. FIG. 12 is an outer appearance showing the printer 60.

An optical element 61 for the optical communication is provided on the handy type information terminal apparatus and an optical element 62 for the optical communication is provided on the printer 60, respectively.

In case where the printer 60 is integrally engaged with the handy type information terminal apparatus, through the optical element 61 and the optical element 62, the data transmission to the printer 60 is carried out and thereby the printing can be carried out. The printer 60 has a printing paper sheet 63 and a paper sheet stacking member 64.

The printer 60 is attachably mounted to and detachably mounted from the rear side of the liquid crystal display 3 of the handy type information terminal apparatus through the fixing element 34 of the printer 60 and the fitting-into portion 33 of the handy type information terminal apparatus.

The size dimensions and the weight of this printer 60 are similarly to those of the above stated picture image scanner and an integrally combined apparatus of the handy type information terminal apparatus with the printer 60 has the portability property.

Further, in the above stated embodiment according to the present invention, the transfer of the data between the handy type information terminal apparatus and the printer 60 is carried out according to the optical communication.

However, as stated in above, the physical connector can employ in place of the optical communication. Besides, in place of the physical connector, the transfer of the data can be carried out according to the optical communication and according to the radio communication.

According to the present invention, for obtaining or transmitting the sure information at the place where the operator has gone, the handy type information terminal apparatus has the fixing element for physically and temporally fixed an optional machine and apparatus, such as the picture image scanner, the photograph use camera and the printer for enable to print the input edition result at that place.

The optional machine and apparatus, such as the picture image scanner, the photograph use camera and the printer is attachably mounted to and detachably mounted from at the rear side of the liquid crystal display unit 3 in the handy type information terminal apparatus.

According to the present invention, the apparatus has the communication means which is enable to easily give and receive the signal at the fixed state through the above stated fixing element.

Accordingly, the picture image scanning operation can be easily performed and the most suitable information can be obtained at the instant through the photography and further in case that the printing is necessary, the information to be printed can be confirmed immediately by the handy type information terminal apparatus.

In addition to the above, the handy type information terminal apparatus can be made the light weight and the compact size dimension and further the handy type information terminal apparatus can be corresponded to the multi-function. As a result, the handy type information terminal apparatus having the high convenience property can be obtained.

The projection area of each of the picture image scanner, the photograph use camera or the printer is the same area, the substantially same area or not exceeding the projection area of the handy type information terminal apparatus, thereby in the combined state with the handy type information terminal apparatus, the portability of the combined apparatus can be improved.

We claim:

1. A handy information terminal apparatus comprising:
   a main body formed as an integral apparatus, having an upper surface and a lower surface, comprising:
   an input unit at the upper surface of the main body for inputting at least character data;
   a liquid crystal display unit under said input unit for displaying input information inputted via said input unit and a result of editing the inputted information; and
   a control substrate under said liquid crystal display unit having means for storing a system program and inputted character data received from said input unit;
   a mounting arrangement at the lower surface of the main body for joining the handy information terminal apparatus attachably to and detachably from an optional machine or apparatus, said mounting arrangement being located at the lower surface of the main body so that said optional machine or apparatus is located underneath a bottom side of said liquid crystal display unit; and
   an electrical element for effecting electrical connection with said optional machine or apparatus when said handy information terminal apparatus is joined by said mounting arrangement to said optional machine or apparatus, so that data may be exchanged between the handy information terminal apparatus and said optional machine or apparatus
   wherein when said main body is integrally joined with said optional machine or apparatus via said mounting arrangement and said electrical element, the integrally combined apparatus forms a vertically stacked, easily carried arrangement having the input unit and liquid crystal display unit on top and the optional machine or apparatus on the bottom.

2. A handy information terminal apparatus according to claim 1, wherein
   the length and width of said optional machine or apparatus fixed temporarily to said handy information terminal apparatus are similar to and not greater than the length and width of the handy information terminal apparatus.

3. A handy information terminal apparatus according to claim 2, wherein
   the dimensions of said integrally combined apparatus corresponds to a B6 size,
   the thickness of said optional machine or apparatus is less than two times the thickness of the handy information terminal apparatus.

4. A handy information terminal apparatus according to claim 2, wherein
   said optional machine or apparatus joined to the handy information terminal apparatus is a picture image scanner,
   said mounting arrangement includes an engagement portion provided on a lower face of the handy information terminal apparatus, and
   said picture image scanner has an engagement portion provided on an upper face thereof, so that said engagement portion of the handy information terminal apparatus can be engaged with and disengaged from said engagement portion of said picture image scanner,
   whereby said picture image scanner is easily attachable to and detachable from the handy information terminal apparatus.

5. A handy information terminal apparatus comprising:
   a terminal apparatus housing formed as an integral apparatus, having an upper surface and a lower surface, comprising:
   an input unit at the upper surface of the terminal apparatus housing for inputting at least character data;
   a liquid crystal display unit under said input unit for displaying input information inputted via said input unit and a result of editing the inputted information; and
   a control substrate under said liquid crystal display unit having means for storing a system program and processing inputted character data received from said input unit;
   a picture image scanner attachably joined to the lower surface of said terminal apparatus housing in such a way that the picture image scanner is attachably mounted on and detachably removable from the terminal apparatus housing, and is located underneath a rear bottom side of said liquid crystal display unit; and
   means for exchanging a signal between said control substrate and said picture image scanner, so that data scanned in from said picture image scanner is taken into and processed by said control substrate and edited for display by the liquid crystal display unit,
   wherein, when said terminal apparatus housing is integrally joined with said picture image scanner, the integrally combined apparatus forms a vertically stacked, easily carried arrangement having the input unit and liquid crystal display unit on top and the picture image scanner on the bottom.

6. A handy information terminal apparatus comprising:
   a terminal apparatus housing formed as an integral apparatus, having an upper surface and a lower surface, comprising:
   an input unit at the upper surface of the terminal apparatus housing for inputting at least character data;
   a liquid crystal display unit under said input unit for displaying input information inputted via said input unit and a result of editing the inputted information; and
   a control substrate under said liquid crystal display unit having means for storing a system program and inputted character data received from said input unit;
   a printer attachably joined to the lower surface of said terminal apparatus housing in such a way that said printer is attachably mounted on and detachably removable from the terminal apparatus housing and is located underneath a bottom side of said liquid crystal display unit of the terminal apparatus; and means for exchanging a signal between said control substrate and said printer, so that data stored in the control substrate is printed by said printer, wherein, when said terminal apparatus housing is integrally joined with said printer, the integrally combined apparatus forms a vertically stacked, easily carried arrangement having the input unit and liquid crystal display unit on top and the printer on the bottom.

7. A handy information terminal apparatus comprising:

a terminal apparatus housing formed as an integral apparatus, having an upper surface and a lower surface, comprising:

an input unit at the upper surface of the terminal apparatus housing for inputting at least character data;

a liquid crystal display unit under said input unit for displaying input information inputted via said input unit and a result of editing the inputted information; and a control substrate under said liquid crystal display unit having means for storing a system program and processing inputted character data received from said input unit;

a digital camera attachably joined to the lower surface of said terminal apparatus housing in such a way that said digital camera is attachably mounted on and detachably removable from the terminal apparatus housing and is located underneath a bottom side of said liquid crystal display unit of the terminal apparatus; and means for exchanging a signal between said control substrate and said digital camera, so that data taken in from said digital camera is supplied to the terminal apparatus, and edited by the control substrate, wherein, when said terminal apparatus housing is integrally joined with said digital camera, the integrally combined apparatus forms a vertically stacked, easily carried arrangement having the input unit and liquid crystal display unit on top and the digital camera on the bottom.

8. A handy information terminal apparatus according to claim 7, wherein the area size of said digital camera is less than the area size of the terminal apparatus housing, the thickness of said digital camera is less than the thickness of the terminal apparatus housing, and the weight of the integrally combined terminal apparatus and said digital camera is less than 1 kg.

9. A handy information terminal apparatus according to claim 8, wherein the dimensions of said digital camera correspond to a B6 size, and the thickness of said digital camera is less than 5 cm.

10. A handy information terminal apparatus according to claim 1, wherein signal transfer between the handy information terminal apparatus and the optional machine or apparatus is carried out by radio communication.

11. A handy information terminal apparatus according to claim 1, wherein signal transfer between the handy information terminal apparatus and the optional machine or apparatus is carried out by optical communication.

12. A handy information terminal apparatus to be used in combination with and when joined to an optional machine or apparatus, comprising:

a terminal apparatus formed as an integral apparatus, having an upper surface and a lower surface, comprising:

an input unit at the upper surface of the terminal apparatus housing for inputting at least character data;

a liquid crystal display unit under the input unit for displaying input information inputted via said input unit and a result of editing the inputted information; and a control substrate having means for storing a system program and inputted character data received from said input unit;

a first fixing element for attachably engaging with and detachably disengaging from a second fixing element provided on said optional machine or apparatus, so that said optional machine or apparatus may be attachably mounted to and detachably removed from the terminal apparatus through engagement and disengagement of said first fixing element and said second fixing element; and a first connector positioned to be engageable with a second connector of said optional machine or apparatus for connecting said handy information terminal apparatus electrically to said optional machine or apparatus, by moving said first connector manually into engagement with said second connector after said optional machine or apparatus and the handy information terminal apparatus have been joined, so that signal transfer may be carried out between the handy information terminal apparatus and said optional machine or apparatus, and data may be exchanged between said optional machine or apparatus and the handy information terminal apparatus, wherein, when said terminal apparatus housing is integrally joined with said optional machine or apparatus, the integrally combined apparatus forms a vertically stacked, easily carried arrangement having the input unit and liquid crystal display unit on top and the optional machine or apparatus on the bottom.

13. A handy information terminal apparatus comprising:

an input unit for inputting at least character data;

a liquid crystal display unit for displaying input information inputted via said input unit and a result of editing the inputted information;

a control substrate having means for storing a system program and processing inputted character data received from said input unit;

a terminal apparatus housing within which said input unit, said liquid crystal display unit and said control substrate are provided to form a terminal apparatus;

a digital camera attachably joined to said terminal apparatus housing in such a way that said digital camera is attachably mounted on and detachably removable from the terminal apparatus housing at a bottom side of said liquid crystal display unit of the terminal apparatus; and means for exchanging a signal between said control substrate and said digital camera, so that data taken in from said digital camera is supplied to the terminal apparatus, and edited by the control substrate, wherein the area size of said digital camera is less than the area size of the terminal apparatus housing, wherein the thickness of said digital camera is less than the thickness of the terminal apparatus housing, and wherein the weight of the integrally combined terminal apparatus and said digital camera is less than 1 kg.

14. A handy information terminal apparatus according to claim 13, wherein the dimensions of said digital camera correspond to a B6 size, and the thickness of said digital camera is less than 5 cm.

* * * * *